April 23, 1963   JACQUES CHARLES CUENDET   3,086,670
ARRANGEMENT FOR THE TILTING OF A LOAD
Filed May 8, 1961
2 Sheets-Sheet 1
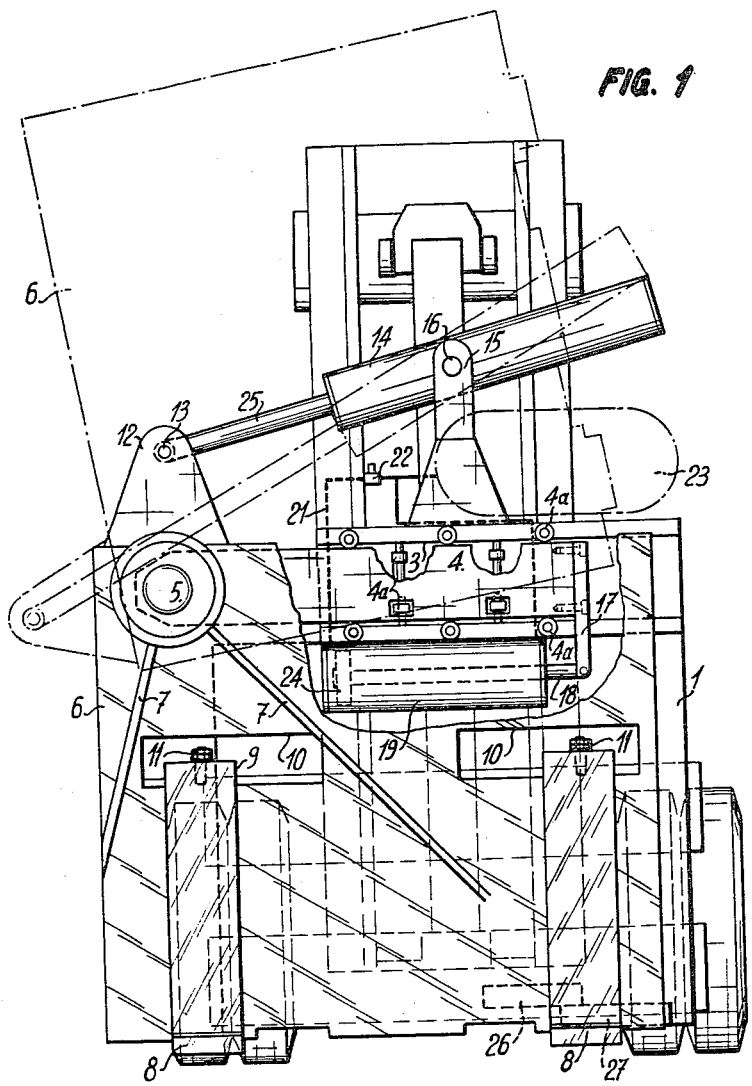
FIG. 1
INVENTOR
JACQUES CHARLES CUENDET

April 23, 1963   JACQUES CHARLES CUENDET   3,086,670
ARRANGEMENT FOR THE TILTING OF A LOAD
Filed May 8, 1961   2 Sheets-Sheet 2
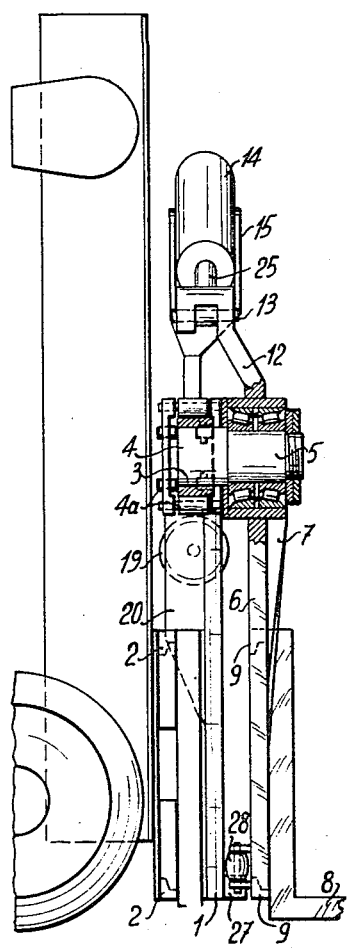
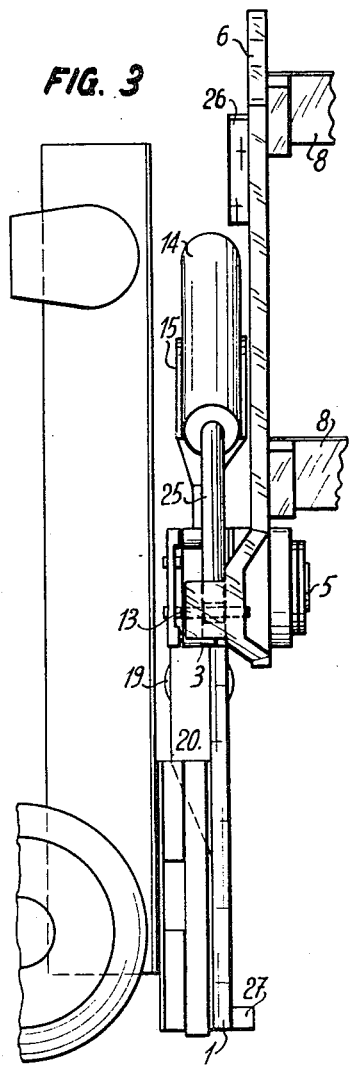
INVENTOR
JACQUES CHARLES CUENDET

3,086,670
ARRANGEMENT FOR THE TILTING OF A LOAD
Jacques Charles Cuendet, Chene-Bougeries, Geneva, Switzerland, assignor to Unitra S.A., Geneva, Switzerland, a corporation of Switzerland
Filed May 8, 1961, Ser. No. 120,816
Claims priority, application Switzerland May 12, 1960
7 Claims. (Cl. 214—701)

My invention has for its object an arrangement for the tilting of a load of the type including a support for a pivot to which is secured a movable plate carrying the load, while means are provided for rotating the plate round the pivot through a predetermined angle with a view to tilting the load.

According to my invention, the support is provided with a slideway along which a carriage is adapted to be shifted with the pivot and plate, while locking means allow securing transiently the carriage to the support and a single auxiliary motor is fitted between the support and a point on the movable plate which is remote from the pivot, in order to, firstly, shift said plate together with the carriage secured thereto along its slideway and, secondly, to make the movable plate rock round the pivot when the carriage locking means are operative.

Said arrangement is of a more particular interest in the case of automobile vehicles such as lift-trucks or the like provided with a raising mechanism intended chiefly for the handling and transportation over short distances of large loads, such as boxes, mechanical parts, crucibles filled with a molten metal and the like. However, said arrangement may also be used with stationary systems or with any automobile vehicle or trailer running over a ground surface of any description, over rails or over a cableway.

The accompanying drawings illustrate diagrammatically and by way of example a preferred embodiment of the arrangement according to the invention as fitted on an automobile vehicle.

In said drawings:
FIG. 1 is a front elevational view of the arrangement.
FIG. 2 is a side view thereof, partly sectional.
FIG. 3 is a view similar to FIG. 2 showing the arrangement in its load-tilted position.

The arrangement illustrated includes a stationary section or support 1 carrying the securing members 2 which allow attaching it to a stationary or moving base secured to the lift-truck or the like. Said support 1 is provided with a channel 3 through which a carriage 4 is adapted to move. Along the surface of said channel are positioned rollers 4a which guide the carriage as it moves freely from the right-hand side to the left-hand side of the channel, and reversely. The carriage 4 is provided at one of its ends, either the right-hand end or the left-hand end, with a large pivot 5 carrying, through the agency of a suitable bearing, the plate 6 rigid with the loading platform or fork 8. Said pivot is located at one of the upper corners of the plate 6 but it may be as well provided at any point of the surface of said plate according to the shape and properties of the goods which are to be tilted.

Starting from the pivot 5, the platform-carrying plate 6 is reinforced by ribs 7 which are welded and are arranged fanwise over the entire surface of the plate.

The platform-carrying plate 6 is provided with two steel arms arranged perpendicularly to its surface. Said steel arms 8 forming the so-called forks or platform are secured to projections 9 engaging the recesses 10 provided for this purpose in the plate 6, on the one hand, and underneath the lower edge of said plate on the other hand. The V-shaped cross-section of said projections 9 engages by an angle of 1 to 2° the V-shaped cross-section of the fork-carrying plate 6, so that, upon fastening of the screws 11 carried by the upper projections 9, there is obtained a wedging of the forks over their carrier plate 6 which prevents them from being shifted when the fork-carrying plate is being tilted.

The fork-carrying plate 6 may receive, through the agency of suitable attachments, any means adapted to engage containers or elements of any material, or auxiliary clamping or fastening parts, which are to be tilted.

The fork-carrying plate 6 includes an upper arm or extension 12, which latter carries at its upper end a pivot 13 transmitting the power exerted by an auxiliary hydraulic motor constituted by a cylinder 14 provided with a double acting piston.

Said cylinder 14 is pivotally carried between the tines of a forked member 15 rigid with the stationary support 1. Said cylinder is fed with a liquid under pressure entering selectively each end of the cylinder through flexible pipes which are not illustrated.

The cylinder 14 may rock between the tines of said forked member 15 and is secured thereto through the agency of a suitable bearing 16.

The carriage 4 carries at its end facing away from the pivot 5 an arm 17 connected with the piston rod 18 of the single acting piston 19 of a hydraulic cylinder. Said cylinder is rigid with the support 1 through the agency of a tautening plate 20. The output for the hydraulic medium such as oil out of said cylinder is located on the side opposed to the piston rod 18 and is connected through a rigid pipe 21 having a large cross-sectional area with an electromagnetic valve 22 controlled from a distance.

Said valve 22 is open when it is not fed with electric current and it closes and locks the passage of oil through the pipe 21 when an operator located at a distance closes the electric circuit over said valve.

When the hydraulically acting oil passes through the valve 22, it flows into an oleopneumatic storage tank 23 which plays a double part consisting in collecting the oil passing out of the cylinder 18 and in maintaining said oil under a predetermined pressure, so as to ensure a complete filling of the cylinder when the piston executes its return stroke.

When the hydraulic cylinder 14 forming the auxiliary motor acts on the arm 12, it causes the carriage 4 to move towards the right-hand side or towards the left-hand side and to carry along with it the movable plate 6 through the agency of the pivot 5. During said transverse movement, the hydraulic cylinder 19 urges the hydraulically acting oil through the electromagnetic valve 22 which is then open since it is not subjected to an electric impulse. The movable plate 6 moves consequently over a predetermined distance over the stationary support 1. This shifting results in that the load which is carried, for instance, on the forks 8, moves also transversely with reference to a stationary point which may be constituted by a telescopic raising device or the like carried by the vehicle, or simply by the point selected for the anchoring of the tilting system.

Said transverse movements have for their object to allow the accurate positioning of the load with reference to the point at which it is to be tilted. A suitable hydraulic control of the auxiliary motor 14 is provided so that said movements may be performed accurately and without any jerks.

When the load has been suitably positioned with reference to said tilting point, the operator may close the passage provided for the oil through the electromagnetic valve 22 and, to this end, it sends into said valve 22 an electric impulse.

The impulse current is selected in accordance with the available current on board the vehicle or in proximity with the plant in the case of a stationary system. Said current may be D.C. or A.C. under various voltages. The closing of the circuit is obtained through a switch controlled by the operator and which may remain in the position given to it, or else, return to zero automatically upon reaching a predetermined tilting point.

When the hydraulically operating oil is prevented from returning to the oleopneumatic storage tank through the valve 22, the piston 24 can no longer continue moving as a consequence of the non-compressible character of liquids. Consequently, the rod 18 and the arm 17 lock the carriage 4 against movement, liquid under pressure continuing then feeding the auxiliary motor 14, there is provided a rotary torque between the pivot 5 and the axis of the bearing 13 carried by the end of the arm 12. Since the arm 12 is rigid with the movable plate and the latter is capable of turning round the pivot 5, there is obtained a rocking movement of said movable plate which carries along with it all the auxiliaries secured to it. By reason of the position and allowed travel of the piston rod 25, the maximum tilting movement for any transverse position of the carriage 4 is equal to 100°, which is 10° beyond the vertical position of a plane passing through the operative surface of the two forks 8.

The hydraulic cylinder 14 being of the double acting type, the return movement of the fork-carrying plate 6, when tilted, is initiated through said extra angle of 10° by the hydraulic pressure exerted on the surface of the piston on the side carrying the rod 25; the sinking movement down to its starting position of the fork-carrying plate 6 is controlled hydraulically, which allows imparting to the arrangement a suitable downwardly directed speed, whatever may be the weight to which the fork-carrying plate 6 is subjected.

When returned in its inoperative position, the fork-carrying plate 6 and its auxiliaries may be again shifted towards the right and towards the left, provided the electric current controlling the electromagnetic valve 22 is switched off, so that the oil may flow freely between the cylinder 19 and the storage tank 23. When the movable plate 6 is in its inoperative position, a stop 26 located at its inner end allows it to rest on a support 27 secured to the support 1, so that the load may be held in a stable position without stressing the cylinder, through the agency of the rod 25 and of the arm 12. Said stop 26 and support 27 are each formed by a section of a bar having a square or rectangular cross-section and fitted respectively on the movable plate 6 and on the support 1. Said two bar sections 26 and 27 are arranged horizontally for the inoperative position of the movable plate and do not prevent the transverse movements of the carriage 4 or of the movable plate 6, since the bar forming the stop 26 is adapted to slide longitudinally over the bar forming the support 27. As a modification, one or more rollers may be inserted between the parts 26 and 27.

Rollers 28 fitted between the cooperating vertical surfaces of the support 1 and of the pivoting plate 6 provide for the rigidity of the whole system, while ensuring a shifting in parallelism with itself of the movable plate 6 with reference to the stationary support 1 during the angular shifting of the movable plate 6.

I claim:

1. In a lift-truck or the like, an arrangement for the lateral tilting of a load, comprising, a stationary support secured to the lift-truck, a channel carried by said support, a carriage adapted to move along said channel, a pivot on and perpendicular to said carriage, a movable plate carried by said pivot and adapted to carry the load, locking means connected to said support and operative to lock said carriage fast with reference to said support, a singel auxiliary motor operatively inserted between said stationary support and a point on said movable plate at a distance from and radial to said pivot and adapted to shift said movable plate and carriage together in a direction parallel with said channel when said locking means are inoperative, whereafter, when said locking means are operated to lock said carriage with respect to said support, further operation of said motor moves said movable plate in an angular direction around said pivot to tilt the load.

2. In a lift-truck or the like, an arrangement for the lateral tilting of a load, comprising, a stationary support secured to the lift-truck, a channel carried by said support, a carriage slidably fitted in said channel, rollers revolvably carried inside said channel and guiding the carriage therein, a pivot on and perpendicular to said carriage, a movable plate carried by said pivot and adapted to carry the load, locking means connected to said support and operative to lock said carriage fast with reference to said support, a single auxiliary motor operatively inserted between said stationary support and a point on said movable plate at a distance from and radial to said pivot and adapted to shift said movable plate and carriage together in a direction parallel with said channel when said locking means are inoperative, whereafter, when said locking means are operated to lock said carriage with respect to said support, further operation of said motor moves said movable plate in an angular direction around said pivot to tilt the load.

3. In a lift-truck or the like, an arrangement for the lateral tilting of a load according to claim 1, wherein, said locking means includes, a hydraulic cylinder, a piston sliding in said hydraulic cylinder, said cylinder and piston being secured rigidly respectively to said stationary support and said carriage, a storage tank for a hydraulic fluid, a pipe connecting said tank with said cylinder to supply the hydraulic fluid therebetween, a valve in said pipe controlling the flow of the fluid between said tank and cylinder, whereby, closing of said valve locks said piston hydraulically against movement inside said cylinder.

4. In a lift-truck or the like, an arrangement for the lateral tilting of a load according to claim 1, wherein, said single auxiliary motor comprises a hydraulic jack pivotally mounted between said stationary support and said movable plate.

5. In a lift-truck or the like, an arrangement for the lateral tilting of a load, comprising, a stationary support secured to the lift-truck, a channel carried by said support, a carriage adapted to move along said channel, a pivot on and perpendicular to said carriage, a movable plate carried by said pivot and adapted to carry the load, said plate disposed vertically and facing said support, rollers fitted revolvably between said stationary support and said movable plate, locking means connected to said support and operative to lock said carriage fast with reference to said support, a single auxiliary motor operatively inserted between said stationary support and a point on said movable plate at a distance from and radial to said pivot and adapted to shift said movable plate and carriage together in a direction parallel with said channel when said locking means are inoperative, whereafter, when said locking means are operated to lock said carriage with respect to said support, further operation of said motor moves said movable plate in an angular direction around said pivot to tilt the load.

6. In a lift-truck or the like, an arrangement for the lateral tilting of a load according to claim 1, wherein, said locking means includes, a hydraulic cylinder, a piston sliding in said hydraulic cylinder, said cylinder and piston being secured rigidly respectively to said stationary support and said carriage, an oleopneumatic tank for a hydraulic fluid, a pipe connecting said tank with said cylinder to supply the hydraulic fluid therebetween, an electromagnetic valve in said pipe controlling the flow of fluid between said tank and cylinder, whereby, closing of said valve locks said piston against movement inside said cylinder.

7. In a lift-truck or the like, an arrangement for the lateral tilting of a load, comprising, a stationary support secured to the lift-truck, a channel carried by said support, a carriage adapted to move along said channel, a pivot on and perpendicular to said carriage, a movable plate carried by said pivot and adapted to carry the load, locking means connected to said support and operative to lock said carriage fast with reference to said support, a hydraulic jack pivotally fitted between said stationary support and a point on said movable plate radial to and at a distance from said pivot and adapted to shift said movable plate and carriage together in a direction parallel with said channel when said locking means are inoperative, whereafter, when said locking means are operated to lock said carriage with respect to said support, further operation of said hydraulic jack moves said movable plate in an angular direction about said pivot to tilt the load, said locking means comprising, a hydraulic cylinder, a piston sliding in said hydraulic cylinder, said cylinder and piston being secured rigidly respectively to said stationary support and said carriage, a storage tank for a hydraulic fluid, a pipe connecting said tank with said cylinder to supply the hydraulic fluid therebetween, a valve in said pipe controlling the flow of the fluid between said tank and cylinder, whereby, closing of said valve locks said piston hydraulically against movement inside said cylinder.

References Cited in the file of this patent
UNITED STATES PATENTS

| | | |
|---|---|---|
| 2,522,128 | Lehmann | Sept. 12, 1950 |
| 2,799,418 | Haldimann | July 16, 1957 |
| 3,002,639 | Cavanagh | Oct. 3, 1961 |

FOREIGN PATENTS

| | | |
|---|---|---|
| 621,952 | Great Britain | Apr. 25, 1949 |